United States Patent [19]
Foucart et al.

[11] 3,909,289
[45] Sept. 30, 1975

[54] CHUCK CLEANING METHODS

[75] Inventors: Donald D. Foucart; Jon R. Cottrill, both of Lancaster, Ohio

[73] Assignee: Anchor Hocking Corporation, Lancaster, Ohio

[22] Filed: July 12, 1973

[21] Appl. No.: 378,678

[52] U.S. Cl.............. 134/2; 117/102 L; 118/70; 134/19; 134/38
[51] Int. Cl.² .................................... B08B 7/04
[58] Field of Search ............ 134/2, 19, 32, 20, 38, 134/63, 105; 65/60, 27, 168; 117/46 FC, 124 E, 102 R, 102 L; 118/70; 264/39, 161; 425/225, 232; 15/4

[56] References Cited
UNITED STATES PATENTS

| | | | |
|---|---|---|---|
| 2,563,085 | 8/1951 | Utsinger................................. | 134/2 |
| 2,731,372 | 1/1956 | Kirsch............................. | 15/21 D X |
| 3,740,259 | 6/1973 | Carl et al. .................... | 117/124 E X |
| 3,749,602 | 7/1973 | Mosier................................. | 134/19 |
| 3,805,985 | 4/1974 | Hagiwara et al. ........... | 117/124 E X |
| 3,830,196 | 8/1974 | Guttman et al....................... | 118/70 |
| 3,854,439 | 12/1974 | Harmuth........................... | 118/70 X |

*Primary Examiner*—S. Leon Bashore
*Assistant Examiner*—Marc L. Caroff
*Attorney, Agent, or Firm*—Wood, Herron & Evans

[57] ABSTRACT

Methods for removing plastic coating material, such as "Surlyn," from chucks which support and transfer glass articles through a protective plastic coating process line, including a step of impinging a flame onto the chucks as they move at line speed. The flame burns on a fuel mixture of about one part natural gas and about four parts oxygen. The chucks are then brushed, quenched with a water spray, and subjected to a stream of pressure air. The flame provided by the specific fuel mixture quickly burns and oxidizes the plastic material leaving only a minimal if any residue on the chuck surfaces.

23 Claims, 6 Drawing Figures

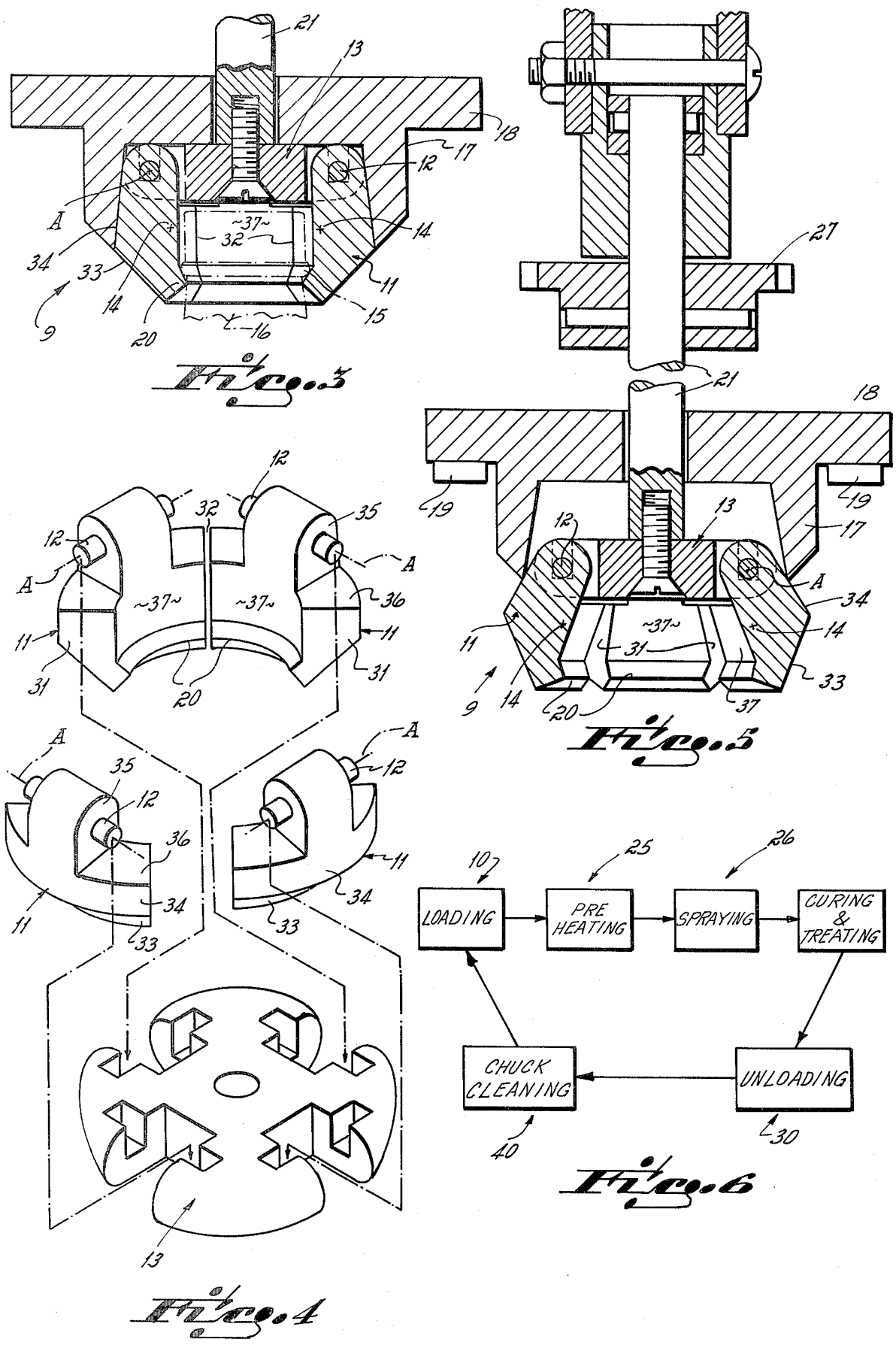

CHUCK CLEANING METHODS

BACKGROUND OF THE INVENTION

This invention relates to the coating of glass bottles and other articles by the application of a finely divided fusible plastic to them, and particularly relates to methods for removing adherent, partially fused plastic coating material from chucks that are used to support and convey the glass articles through the plastic coating process.

The application of a plastic "skin" or coating on the outside surface of a glass article, especially a glass container such as a carbonated beverage bottle, is useful because it protects the glass from the surface abrasion which would otherwise inevitably occur in manufacture, labeling, filling, packing and/or use. The plastic coating prevents scratching of the underlying glass, which would reduce its strength. The plastic also provides a degree of "cushion" and thereby softens an impact blow which might otherwise cause breakage. Moreover, the plastic coating resists scattering of glass fragments if the article is broken, which is especially desirable for pressurized beverage containers.

This invention has particular relation to those coating processes wherein the articles to be coated are carried in chucks and are heated to a temperature at which partial resin fusion will occur, and wherein the heated chucks are exposed to and come in contact with resin particles. This invention is most especially useful with the electrostatic dry powder spray process for applying such coatings. In that process, the resin particles are electrostatically charged oppositely to the glass article (which acts as a ground) and are projected or sprayed toward the article by a relatively gentle air current. The attraction of opposite charges draws the charged particles to the article, to which they adhere electrostatically. The glass article is heated so that it becomes electrically conductive and thereby can act as a ground, and the heat may partially fuse the adhered particles. In any event, a final heat setting step is necessary to completely fuse the particles so that they coalesce to form a smooth, continuous coating which is adherent to the glass surface.

The plastics used for such coatings are well known in the art. They are referred to herein as finely divided heat fusible plastic materials, as distinguished from materials which are applied as sheets or sleeves. As applied to the article, the coating is typically clear and transparent, although it may be colored, or made translucent or opaque, if desired, by including a pigment, coloring ingredient, or opacifier in it. The suitable plastic materials for such coating processes include polyethylene, polyvinyl chloride, ethylene vinyl acetate, and other resins in powder form. Protective coating materials which have been found to be especially useful are the ionic copolymers of alpha olefins and alpha, beta - ethylenically unsaturated carboxylic acids, generally of the type described in U.S. Pat. No. 3,264,272. One such ionic copolymer material which is formed from ethylene and methacrylic acid is available commercially from DuPont under the trademark "Surlyn." This material in particular has been promoted in the market by reason of its clarity, its elasticity and its degree of adherence to the glass.

For the commerical application of a coating of such finely divided, heat fusible plastic resins, the glass articles are supported and conveyed through the coating process by chucks which grip the containers at the finish (i.e., the cap or closure end). The chucks may, for example, be of the type particularly described in a copending Pat. application Ser. No. 358,864 filed on May 10, 1973 now U.S. Pat. No. 3,863,753, the disclosure of which is herewith incorporated by reference. Generally, the chucks have movable jaws which open and close to grasp or release the finish portion of the container, and they are carried on a moving conveyor line. After being loaded into the chuck which is to carry it, the chuck carries the container through a preheating oven, wherein they are heated, for example to about 300°–375° F. (surface temperature, as measured by optical pyrometer). The chuck then carries the container through the coating station where the resin particles are sprayed on the container. The sprayed, charged particles adhere to the grounded heated bottle and partially fuse upon contact. The adherent particulate material is then set or fused to a clear, smooth continuous film, by heating the bottle in an oven, (in the case of Surlyn, the final heating may be, for example, to be peak temperature of 390°F., over a three minute period.). Following the heat step and cooling, the result is an attractive, commerically acceptable, economical plastic coated glass container or other article.

The jaws of the chuck described in the above identified application are constructed so that when released, they can pivot to an open position and the finish portion of a container can be introduced between them prior to closure so that when closed, the jaws grasp and support the container. Closing of the jaws is accomplished by the movement of a restrictive sleeve into position about the jaws to cam the jaws to closed position.

For any chuck used to carry containers through a coating line, the movable chuck elements such as the jaws and sleeves must remain relatively free and capable of movement with respect to each other so the chuck can operate in a normal manner. If the chunk jaws should stick together as a result of plastic material buildup, they tend to resist opening to receive the glass article when it is placed between the sticking jaws. Also, sticking jaws cause release failures at glass release stations.

As will be described, sticking chucks are unfortunately common in coating processes wherein a finely divided plastic resin is sprayed or otherwise applied to heated glassware. It is to this specific problem, with the complete coating process, that the present invention is directed.

In such coating processes, the containers are preheated (prior to coating) in order to insure adequate adherence of the powder to the glass prior to final heat fusion, the electrostatic attraction of sprayed particles not being optimum for this purpose. Also heating of the containers is advantageous to make them uniformly electrically conductive so that they will act as grounds for electrostatic spraying.

During the preheating step, the chucks also become heated and overspray of the resin powder particles inevitably sticks to the heated chucks. Although it is commerically desirable that the coating not be applied to the finish of the container but rather stop below the finish, and although the spraying station is set up to provide this result, some overspray ends up on the chuck parts.

As the chucks convey the glass articles further through the process and specifically through the heat setting operation, the plastic material on the chucks is also at least partially set or fused, and it accumulates on the various chuck parts, eventually causing severe sticking, jamming and binding of the movable parts, thereby rendering the chuck inoperable. The parts stick and glassware may be broken either during loading or in release from an inoperable chuck at an unloading station.

The cleaning or removal of the fused plastic material (and particularly of Surlyn) from chucks has presented a severe operating problem, and a substantial research effort has been directed toward its solution.

While the mere removal of the undesired material may be accomplished in a variety of ways, a necessary feature of any practical solution is to remove the plastic material during movement of the chucks so that the coating and cleaning process can be performed on a continuous basis, without slowing or down time for chuck cleaning. It has been found that the nature of the plastic coating material, particularly Surlyn, required chuck cleaning at least every five cycles of chuck movement through the coating process and, since a large number of chucks (approximately 500 to 600 in one embodiment) are used in a coating apparatus, individual handling, dismantling or other such treatment should be avoided in order to provide an acceptable output rate from the coating process.

Very broadly then, the problem stated another way has been to keep the chucks operational in the above environment without stopping or slowing the coating process to do so.

Although a great amount of research was directed to the practical application of suggested solutions to this problem and while follow-up research was directed to the solutions suggested by the supplier of the Surlyn material, it is only the present invention which has been found to be an acceptable solution in light of the above mentioned requirements. A number of the previous but unsuccessful attempts at a solution are herewith set out in order to put the problems faced and the present invention in their proper perspective.

One of the first attempts at solving the problem was to chrome plate the (brass) chuck jaws and movable (cast iron) sleeve of the chuck. This simply did not provide an acceptable solution since the plastic material tended to accumulate undesirably on the plated chucks, similar to its adherence on non-plated chucks.

Another attempt to provide a solution included the coating of the chuck members with a material also supplied by DuPont and known in the trade by the name "Teflon II." It was found that when the chuck members were coated with "Teflon II" the plastic material was much easier to strip from the chuck members. However, the coating process line had to be shut down and the coating manually peeled from each chuck member, the chucks being dismantled for each cleaning cycle. Continuous operation of the chucks through the coating process simply was not possible during the cleaning period.

Another attempted solution included the application to the chucks of steam at high temperature and under high pressure through steam manifolds. This was not adequate to remove the plastic material from the chuck members while they moved at line speed.

Another attempt included the sand blasting of the chuck members when they had become coated with the plastic material. It was found, however, that the plastic material on the chuck members tended to act as a mask and that the blasting operation detrimentally etched bare metal portions of the chuck members rather than removing the plastic coated portions of the chucks.

Another attempted but unsuccessful approach included the vapor blasting of the chunks in vapor tanks of trichloroethylene. This proved to be difficult to perform in a practical manner.

Several other suggested solutions for the problem included attempts at burning the plastic material from the chucks. Specifically, it was found that if the chucks were placed in an oven at approximately 750° F. for at least four hours, the Surlyn material on the chucks would be oxidized leaving only a flaky material or residue which could be wiped with a rag. Of course, this solution was not acceptable for the reason that it required approximately four hours to burn and oxidize the Surlyn to a form in which it could be wiped off. In addition, this "cookoff" created a vapor which was not acceptable.

Another attempt in buring off the Surlyn material included placing the disassembled chuck in a lehr at about 1100° for approximately 15–40 minutes. This process was also much too slow due to the fact that the chucks had to be dismantled and, as previously stated, where there are quite a number of chucks, such as approximately 550, all in line, the dismantling of each chuck having at least four jaws and a movable sleeve was a time consuming operation and required the coating operation to be shut down. Most of the prior attempts of solutions herein set out required this dismantling and are unsatisfactory for that reason alone.

A further attempt at burning off the Surlyn material from the chucks included the use of a welding torch provided with a cutting attachment and utilizing an acetylene-oxygen fuel mixture. This particular process was rather difficult to apply since it provided only a relatively localized heating area. The Surlyn overspray, however, accumulated over a substantial portion of the diverse chuck surfaces and it was necessary to heat the overall surface areas of the chuck rather than a localized area. Too much fuel was required in order to establish the required overall heating and continuous heat applications by this method was impractical.

Another "burning" approach included the attempt to cook off the Surlyn by induction heating but this did not provide an acceptable solution.

A still further "burn-off" attempt was made by heating the chucks with gas-air infra-red burners and alternately with a flame burning on a natural gas-air mixture. Neither of these proved successful.

Additionally, various disclosures in known U.S. Pats. are directed to burning off various types of materials from various surfaces. For example, see the disclosures in U.S. Pat. Nos. 769,091; 1,059,957; 1,733,750; 2,963,389; and 3,454,426. None of these relates to or provides a solution to the specific problem at hand.

A further approach included establishing an electrical charge on the chuck during the coating step which was of the same polarity of the charge on the powder particles in the hope that this would repel plastic particles and thereby prevent accumulation. This did not prove entirely satisfactory as some of the plastic material still adhered to the heated chuck members.

A further approach that was tried included the use of a molten rock salt bath into which the chucks were immersed for a period of time. This was unsatisfactory as it required too much space and time to be practical in an operating plant.

Several attempts were also made at masking the chucks from the plastic material, including the use of a rubber boot about the chucks. However, it was found that the jaws could not be entirely isolated from the powder particles due to the clearance required for jaw opening and closing. Various forms of metal shrouds were also utilized in this masking attempt and were also found to be unacceptable.

A different form of solution which was attempted included construction of the chuck jaws from materials to which the plastic material perhaps would not adhere. These materials included carbon, solid "Teflon," and a material known in the trade as "Insuroc," a form of phenolic resin material, commonly used, for example, in the making of feed screws for glassware handling.

Also attempted was the mere brushing of the material from the chucks without the application of any heat but this simply did not work in a practical manner.

From the above, it can be noted that while an extensive research effort was directed to solving the problem of material buildup on the chuck parts, until the present invention, a commercially acceptable solution to the problem was not known.

Accordingly, it has been one object of the present invention to clean plastic material from chucks of the type utilized to support and convey glassware through a plastic coating process.

A further objective of the invention has been to provide a method for cleaning plastic material from chucks of the type utilized to support and convey glassware through a protective plastic coating process without requiring slowing down or stopping the process during chuck cleaning.

A further object of the invention has been to provide a method for cleaning plastic material from glassware supporting chucks without destroying the various metals or materials from which the supporting chucks are constructed.

A further objective of the present invention has been to provide methods for removing plastic material from glass article supporting chucks of the type used to convey the articles through a protective plastic coating operation, the removal operation being sufficient to completely remove the plastic so that no residue is left on the chuck members in order to insure that no obnoxious residue will fall on subsequent new containers prior to or during their coating.

Another objective of the invention has been to provide a method for flashing and oxidizing Surlyn from glassware supporting chucks during movement of the chucks at a normal speed in a protective plastic coating process such that the chucks can be cleaned and cooled during movement at line speed and prior to the chucking of new bottles to be coated.

Very briefly, the present invention contemplates removing a plastic material, for example, Surlyn, from glass container supporting chucks during movement of the chucks in a protective plastic coating process, and includes impinging a natural gas-oxygen flame on the chucks to flash and oxidize the plastic material, and thereafter brushing any remaining oxidized plastic residue from various chuck surfaces. The natural gas-oxygen mixture comprises approximately four parts of oxygen to about one part of natural gas. The chucks are impinged on by the flame for a relatively short time and on the order of approximately 30 seconds or less.

After the burning step, the chucks are rotated past fixed wire brushes which serve to brush any remaining residue from the various surfaces of the chuck.

Following this, the chucks are quenched in water so that they are cooled and do not "up-shock" the relatively cool bottles which are placed in them for the next pass through the coating apparatus.

After quenching, the chucks can be subjected to a stream of pressurized air which serves to blow any remaining oxidized plastic residue for the chucks.

This particular method has the advantage that it efficiently cleans and removes plastic material from the chucks so that the chucks can remain operational throughout the coating process, and does so during movement of the chucks at line speed so that the coating process need not be slowed nor shut down for chuck cleaning.

Chuck disassembly is completely unnecessary and the chucks can be cleaned and cooled and thus prepared for subsquent glassware grasping and conveying through the coating process within a relatively short line distance.

These and other objects and advantages will become readily apparent from the following detailed description of a preferred embodiment and from the drawings in which:

FIG. 3 is a cross-sectional view of one chuck assembly embodiment showing the chuck in a closed or glassware supporting condition;

FIG. 4i is an exploded view of a chuck showing the chuck jaws and the chuck body;

FIG. 5 is a cross-sectional view showing the chuck assembly with the chuck being in an open or releasing position;

FIG. 6 is a diagrammatic flow chart showing the various steps or stations in a glassware coating process according to the invention.

DETAILED DESCRIPTION

Figure 1:
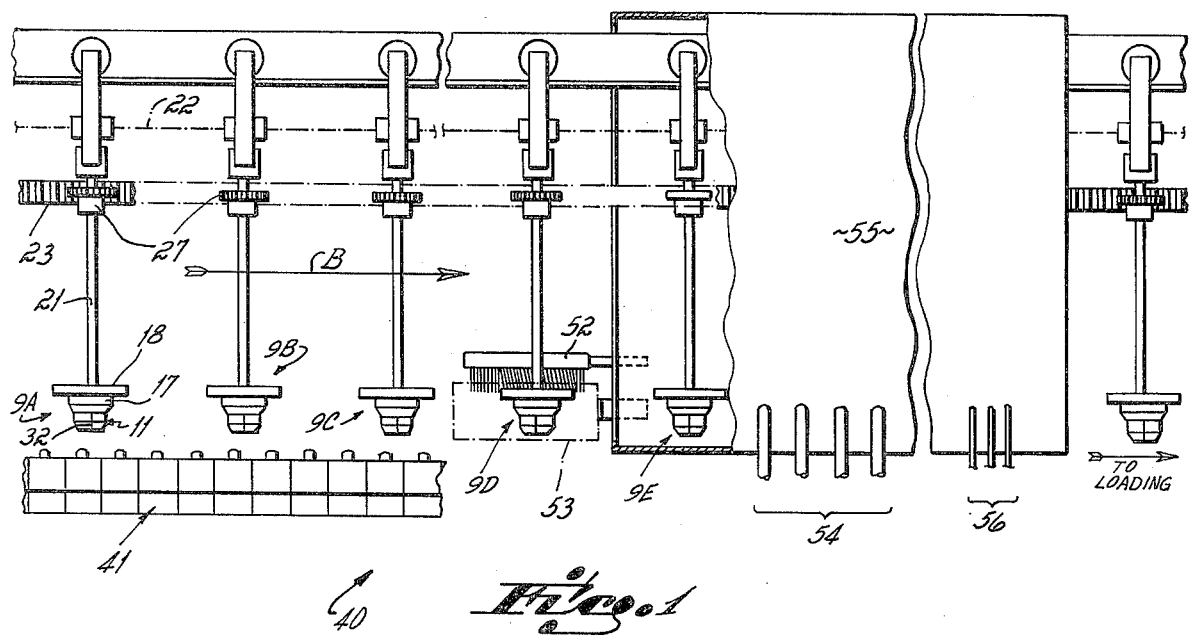
FIG. 1 is a general plan view showing various diagrammatic features of the present invention.

Referring now to the drawings, there is shown in FIG. 6 a diagrammatic flow chart of a protective plastic coating process embodying the features of the present invention. In a preferred embodiment, the process includes the application of a protective plastic coating to glassware containers such that the containers are thereafter protected from abrasion and can be, therefore, initially formed with reduced wall thicknesses.

As previously stated, protective coating materials which have been found to be especially useful are the ionic copolymers of alpha olefins and alpha, beta - ethylenically unsaturated carboxylic acids, generally of the type described in U.S. Pat. No. 3,264,272. In this embodiment, the particular coating is an ionic copolymer material which is formed from ethylene and methacrylic acid and is available from DuPont under their trade name "Surlyn."

The glassware containers are picked up, supported and conveyed throughout the coating process by means of chucks as specifically described in the aforementioned co-pending patent application Ser. No. 358,864.

At a loading station indicated at 10 in FIG. 6, the chucks are operable to grasp a glassware container in a positive manner.

The particular construction of each chuck referred to can be seen in FIGS. 3, 4 and 5 of the drawings. The chuck assembly 9 comprises four jaws 11 which are supported by pivot pins 12 in a chuck body 13 which is provided with recesses as shown to accept the pins 12. Once in the chuck body, the jaws are free to pivot about an axis indicated by the capital letter A in the drawings.

Due to the fact that the center of gravity 14 of the chuck jaws is located approximately where shown, the chuck jaws (when not confined) tend to pivot about pins 12 to an open condition as shown in FIG. 5. Each chuck assembly 9 further includes an annular sleeve-like member 17 formed integrally with the flange 18. The sleeve and flange unit may be made of any suitable material and is vertically movable to engage and to urge inwardly the jaws 11 of the chuck to a closed or grasping position. FIG. 3 shows the annular sleeve 17 surrounding and holding the jaws 11 in a closed condition about the finish portion 15 of a glassware container 16.

During the loading operation at the station 10 of FIG. 6, a glassware container such as the one indicated at 16 is introduced upwardly into the open jaws in the chuck. Prior to the introduction of the finish portion 15 of the glassware container into the chuck jaws, the flange 18 is engaged by a lifting fork, indicated only diagrammatically at 19 in FIG. 5. The flange, together with the annular sleeve 17, is thereby raised from the chuck jaw 11 so that the jaws may swing outwardly into an open position.

Once the glassware container is raised into the chuck jaws, the lifting fork 19 is lowered and the flange 18 and sleeve 17 is pulled downwardly by gravity to force the chuck jaws inwardly. Inward movement of the jaws grasps, by way of lips 20, the finish portion of the glassware container. From this point, the glassware container is securely supported by the chucks which in themselves are attached to respective lower ends of the shafts 21.

The shafts 21 are attached at their upper ends to an endless conveyor chain 22 disposed on runs for pulling the chucks and the supported glassware containers through the various stations of the coating process. The shafts 21 are rotationally mounted at their upper ends so that the chucks, together with their glassware containers, can be rotated as required.

In the preferred embodiment, approximately 500 chucks are connected via the conveyor chain 22 on 6 inch centers. The entire line can be moved through the coating process to provide a discharge rate of up to 50 containers per minute. The specific features of the chucks and of the general conveying line, the glassware loading and unloading apparatus and of the conveying line in general are shown in the previously described patent application Ser. No. 358,864.

From the loading station, the glassware articles are transferred via the chucks to a preheating station 25 where the surface temperature of the glassware containers (as measured by optical pyrometer) is raised to a temperature of about 300° to 375° F. The bottles are then transferred by the chucks to a spraying station 26 where the Surlyn plastic material is applied to the containers by an electrostatic dry powder spray process utilizing, in a preferred embodiment, a DeVilbiss Model No. 348 spray apparatus at 60 kv. D.C. output.

At the spraying station, the chucks rotate the glassware containers so that the dry powder is sprayed onto the complete surface of the glassware container. The rotation is accomplished via a pinion gear 27 which is attached to the rotatable shaft 21, and the cooperation of the pinion gear with a stationary rack located at the spraying station. Engagement of the rack by the pinion gear rotates the chuck throughout its movement through a linear distance equal to the length of the rack.

The chucks are then pulled via the conveyor chain 22 through a curing station where the adherent particulate material is cured or fused to a clear smooth continuous film by heating, for example, the bottle in an oven to a peak temperature and preferably about 390° F. over a three minute period. Following this heat curing step, the coating is then otherwise treated and the chucks convey the glassware containers to an unloading station 30 where a fork lift such as that indicated diagrammatically at 19 is utilized to lift the flange 18 and annular sleeve 17, thereby allowing the chuck jaws to open and release the glassware container.

From the above description, it can be seen that the chuck jaws serve to support and convey the glassware container throughout the coating process. As a result of this function, the chucks themselves tend to become coated by overspray of the plastic material in powder form at the spraying station. At the curing station, the chucks are also subject to the heat which is applied to the glassware containers and the overspray material on the chuck surfaces tends to become cured on the chuck surfaces. Buildup of plastic material on the chuck surfaces is extremely detrimental as it tends to stick the movable jaws and sleeve members of the chuck.

Specifically, plastic material is located on the side portions 31 of the chuck jaws, dry powder overspray having been forced into the very slight gaps 32 which exist between the chuck jaws even when the jaws are in a "closed" position. The plastic material also tends to accumulate on the outer surfaces indicated at 33 and 34 of the jaws. The overspray plastic material also tends to find its way onto the supporting pins 12 of the chuck jaws and onto the upper surfaces 35 and 36 of the chuck jaws as well as onto the inner surfaces 37 of the jaws and onto various portions of the chuck body 13 as shown in FIG. 5. In addition, the overspray of particulate matter accumulates on the annular sleeve 17 and on the flange 18 of the chuck.

Since the movable parts of the chuck including the jaws and annular sleeve and flange unit are relatively stationary with respect to each other throughout the spraying and curing steps of the coating process, the plastic material can build up or otherwise accumulate on the various surfaces and tend to stick the various parts together. Thus, even if the lifting fork 19 may be able to lift the sleeve 17 from the chuck jaws at the unloading station, the jaws will stick together and will not freely rotate into their open position as shown in FIG. 5. At this point, it has been necessary in the past to release the glassware container, held by any particular chuck which is stuck, by breaking the glassware container within the chuck in order to keep the line moving. Of course, and prior to the application of the present invention, any chuck which has its parts stuck together and rendered inoperable by the accumulation of the plastic material thereon will not open at the loading station and, when a bottle is urged upwardly into the chuck, its finish portion can be broken by the sticking chuck jaws.

While one pass of a selected chuck through the coating process may not cause the chuck parts to stick, we have found that after approximately five passes, and in some instances less than five passes, the chucks become too fouled to perform. It is thus necessary to minimize and indeed remove the accumulated plastic material on the chuck parts in order to prevent such sticking as would render the jaws inoperable.

Thus, the chuck cleaning station indicated at 40 in FIG. 6 is provided between the unloading station and the loading station and at this point accumulated plastic material is removed from the chuck surfaces. The preferred removal method which will hereinafter be described is specifically directed to removing plastic material known as "Surlyn" from the chuck assemblies. It is contemplated that the method may be practically utilized for the removal of other types of protective plastic coatings having somewhat similar characteristics.

FIG. 1 of the drawings indicates diagrammatically the various preferred method steps for removing the plastic material from the chucks. In FIG. 1, the chucks are conveyed through the cleaning station in the general direction of arrow B. At this time, the chucks are moving at the normal operational velocity through which they move during the coating process. The chucks, however, are empty, the glassware containers having been previously removed from them at an unloading station 30. At the cleaning station as shown in FIG. 1, a burner assembly indicated generally at 41 is provided to direct a flame onto successive chuck assemblies, such as those at 9A, 9B, and 9C, as they are conveyed past the assembly. The chucks are rotated as they move linearly past the burner assembly 41 by virtue of the contact of the pinion gears 27 with the stationary rack 23.

Figure 2:
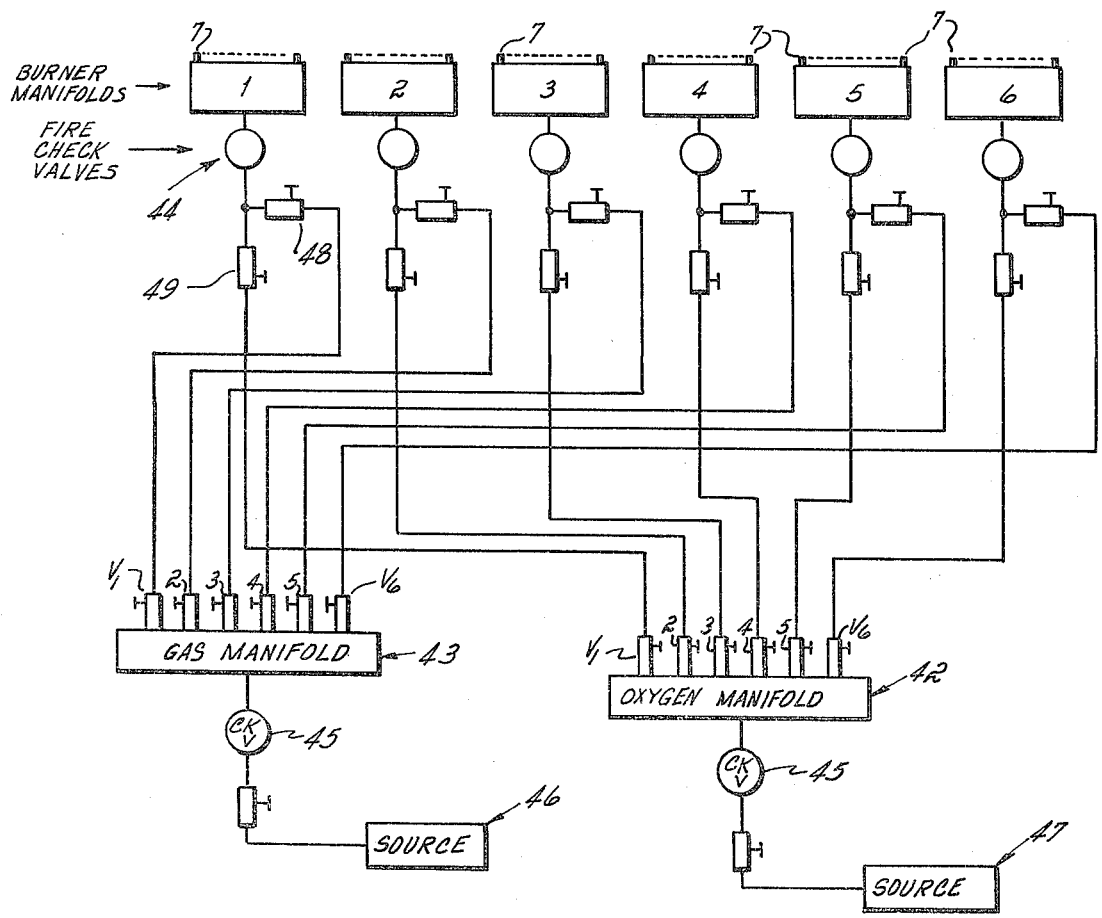
FIG. 2 is also a diagrammatic view showing several burners and the oxygen and gas manifolds for supplying fuel to the burners.

The burner assemblies 41 are shown in diagrammatic detail in FIG. 2 of the drawings, and comprise a plurality of burner manifolds numbered 1–6. Each burner manifold has a number of flame nozzles 7 positioned to direct flame outwardly onto the chuck assemblies. The burners are connected to appropriate natural gas and oxygen manifolds via respective valves, designated $V_1$ through $V_6$ on each manifold, which control the fuel mixture in a manner as will be described. Thus, each burner manifold is connected via appropriate valves to an oxygen manifold 42 and to a gas manifold 43. Fire checks such as at 44 may be provided as a safety feature as known in the art and appropriate check valves are also provided between the oxygen and gas manifolds and between respective sources of oxygen and natural gas indicated at 46 and 47 respectively. Secondary or fine adjustment valves, such as at 48 and 49, are located in the respective oxygen and gas lines which connect the respective manifolds to the respective burners and provide control adjustments for the oxygen and natural gas prior to their actual mixing. The various valves described above are set so that the fuel provided to each burner comprises a mixture of about four parts oxygen to about one part natural gas.

The burner assemblies 1–6 are disposed at the cleaning station such that the flames projecting therefrom impinge directly onto the chuck assemblies at a time where the chuck assemblies are unconfined as by walls or the like and so as to concentrate heat on the chucks by the direct flame. We have found that the abnormally high oxygen content of the natural gas-oxygen fuel mixture provides a flame sufficient to quickly flash the Surlyn plastic material (which has been found to have a "flash point" of about 2000° F.) on the chucks and to thereby oxidize it and reduce the material to a minimal residue which can be thereafter easily removed, such as by brushing. Additionally, we have found that brushing of some surfaces is unnecessary, the plastic flashing, oxidizing to a minimal residue and merely falling off the chucks' surfaces.

In the preferred embodiment, each of the burners 1–6 is constructed so as to be approximately 1 foot long and the burners are located proximate each other so that the complete assembly is approximately 6 feet long. When the chucks are on approximately 6 inch centers and when the line speed of the chucks is set so that the discharge of containers from the coating process is approximately 30 containers per minute, the chucks move past the burning assembly at a rate of approximately 15 feet per minute and are thus heated for a time period of something less than 30 seconds. Measurement of the "skin" temperature of the chuck members just downstream of the burner assembly has shown that temperature to be approximately 1000° F.

We have found that the flame that is produced by the stated fuel mixture is hot enough to very quickly flash the Surlyn and to oxidize it leaving only a minimal residue of oxidized material. The chuck members, however, remain below that temperature which could destroy the brass jaws, the cast iron sleeve, or other metal materials from which the various portions of the chuck assembly are made.

Of course, the length of the burner assembly and the line speed of the chuck assemblies can be adjusted. It is only necessary to flash and oxidize the Surlyn to leave a minimal residue while not using temperatures or times which would deteriorate the chuck assembly materials.

After the burning operation, the chucks are next subjected to a brushing step as shown in FIG. 1. Two brushes such as the single brush which is shown at 52 in FIG. 1 are positioned on each side of the shaft 21 and above the chucks to brush the top surface of the flange 18. Two brushes such as the one shown diagrammatically at 53 in FIG. 1 are positioned such that their bristles are disposed in a generally horizontal direction for brushing the side portions of the flange 18. The chuck assemblies such as the one indicated at 9D and including sleeves 17 and the exposed portions of the chuck jaws 11 are rotated past the burshing station via the rack 23.

As can be seen from FIG. 1, the brushes as at 52 and 53 are not operable to directly engage and brush interior surfaces of the chuck assembly such as those jaw surfaces indicated at 31, 35, 36 and 37 and such as various surfaces on the chuck body 13 subject to the overspray. We have found, however, that the flame burning on the described fuel mixture of oxygen and gas, when applied to the chuck assemblies, is sufficient to so completely flash and oxidize the Surlyn material that what little residue remains tends to be very loose and simply falls from the various unbrushed chuck surfaces or is thereafter flushed or blown away as hereinafter described.

After brushing of the exposed surfaces as shown, the chucks are moved into the quenching area where water is sprayed onto them through water lines, a portion of which are shown at 54 in FIG. 1. In order to capture water spray, an enclosure 55, having a longitudinal slit in its top for passage of the upper portion of the chuck support shaft 21, is provided over this portion of the cleaning station. The quenching operation serves to flush loosely remaining residue left on the chuck surfaces after brushing and also to cool the chucks down to a temperature which will not "up-shock" and crack or break the relatively cool bottles which are to be placed in the chucks for the next pass through the coating apparatus.

After the water quenching step, pressurized air is blown onto the chuck assemblies (still within the enclosure 55) such as through the air lines 56. This serves to further cool the chuck and to blow still remaining residue of plastic material from the chuck bodies.

Once the chucks have been subjected to the cleaning process as above described, Surlyn buildup or accumulation is removed and the jaws are free to operate in the normal manner to open and to grasp glassware containers introduced into them. The jaws are relatively clean at this point and the undesirable dropping of flashed Surlyn residue onto the glassware, so as to detract from the appearance of the coating to be applied to the glassware, is substantially reduced.

It can well be appreciated that the above described cleaning process is operable to efficiently remove Surlyn material from the chucks while the chucks are moving at line speed without requiring any slowing or downtime of the coating process in order to clean chucks from plastic material buildup. Further, by the above specifically described process, the chucks are very quickly heated to the temperature required to flash and completely oxidize the "Surlyn" and yet the chucks can be cooled back down to a practical temperature so that they do not "up-shock" new bottles which are to be introduced into the chucks. Also, the particular fuel mixture provides a flame sufficient to burn and oxidize the plastic material in a relatively short time so that the temperature of the chuck parts does not reach a point at which the parts would deteriorate.

Other modifications and advantages will become readily apparent to those of oridinary skill in the art without departing from the scope of the invention, and we intend to be bound only by the appended claims.

We claim:

1. A method of removing a protective plastic coating material from chucks of the type used to support and transfer glassware during a protective coating process, the method comprising the steps of;

impinging a flame burning on a natural gas-oxygen mixture comprising about one part gas to about four parts oxygen on said chucks and thereby burning and oxidizing said plastic coating material, brushing any residue, remaining from said burning and oxidiation, from said chucks, cooling said chucks by applying relatively cool water to them, and blowing a stream of pressure air against said chucks to blow any remaining residue therefrom.

2. A method of removing plastic coating material from chucks of the type used to support and transfer glass containers during a protective plastic coating process wherein a finely divided ionic copolymer material, which is formed from ethylene and methacrylic acid, is sprayed onto said containers by an electrostatic dry powder process and is then heat cured to form a protective plastic coating thereon, and wherein said containers are preheated while in said chucks and particles of said material adhere to said chucks, the method comprising the steps of;

impinging a flame, burning on a fuel mixture of about one part natural gas and about four parts oxygen, on selected chucks during said process at a time when said selected chucks are not supporting or transferring glassware, thereby burning and oxidizing said ionic copolymer material on said chucks, and thereafter burshing oxidized residue remaining on said chucks from said chucks.

3. The method of claim 2 further comprising the subsequent steps of cooling said chucks and then blowing remaining residue from said chucks.

4. A method of applying a protective plastic coating to glassware and of removing plastic material from glassware supporting chucks including the steps of;

continuously conveying glassware from a loading station at a predetermined speed with supporting chucks, preheating said glassware whereby said chucks are also heated, applying a powdered material to coat said glassware, curing and treating said powdered coat to form a protective plastic coating on said glassware, releasing said glassware from selected chucks, and thereafter removing plastic material from said selected chucks by impinging a flame, burning on a natural gas-oxygen fuel mixture comprising about one part gas and about four parts oxygen, on said selected chucks to burn and oxidize said plastic material, all while continuously moving said selected supporting apparatus toward said loading station at said predetermined speed.

5. A method as in claim 4 including the further step of cooling said chucks, after impingement of said flame thereon, by quenching them with water.

6. A method of removing plastic coating material comprising an ionic copolymer material which is formed from ethylene and methacrylic acid, from chucks of the type operable to support and convey glassware through a protective plastic coating process at a predetermined speed, the method comprising the steps of;

impinging a flame, burning on a natural gas-oxygen fuel mixture comprising about one part gas and about four parts oxygen, on said chucks, while said chucks are moving at said predetermined speed, thereby burning and oxidizing said material in order to remove it so as to maintain said chucks operational.

7. A method as in claim 6 wherein said flame is impinged on said chucks for less than about 30 seconds to burn and oxidize the plastic coating material.

8. A method as in claim 7 including impinging said flame on said chucks for a time period of from about ten seconds to about 30 seconds.

9. A method as in claim 7 including brushing said chucks after said flame impingement to remove said oxidized material.

10. A method as in claim 9 wherein said brushing step includes rotating said chucks against fixed wire brushes.

11. A method as in claim 7 including impinging a stream of pressure air against said chucks to blow any remaining oxidized material therefrom.

12. A method as in claim 7 wherein said flame impingement step is performed when said chucks are empty and do not support glassware.

13. A method of removing a protective plastic coating material comprising an ionic copolymer of alpha olefins and alpha, beta-ethylenically unsaturated carboxylic acids from chucks of the type operable to support and convey glassware through a protective plastic coating process at a predetermined speed, the method comprising the steps of:
impinging a flame, burning on a natural gas-oxygen fuel mixture comprising about one part gas and about four parts oxygen, on said chucks, while said chucks are moving at said predetermined speed,
thereby burning and oxidizing said coating material in order to remove it so as to maintain said chucks operational.

14. A method of removing a protective plastic coating material selected from the group comprising polyethylene, polyvinyl chloride and ethylene vinyl acetate, from chucks of the type operable to support and convey glassware through a protective plastic coating process at a predetermined speed, the method comprising the steps of:
impinging a flame, burning on a natural gas-oxygen fuel mixture comprising about one part gas and about four parts oxygen, on said chucks, while said chucks are moving at said predetermined speed,
thereby burning and oxidizing said coating material in order to remove it so as to maintain said chucks operational.

15. A method of removing a protective plastic coating material from chucks of the type operable to support and convey glassware through a protective plastic coating process at a predetermined speed, the method comprising the steps of:
impinging a flame, burning on a natural gas-oxygen fuel mixture comprising about one part gas and about four parts oxygen, on said chucks, while said chucks are moving at said predetermined speed,
thereby burning and oxidizing said protective plastic coating material in order to remove it so as to maintain said chucks operational.

16. A method as in claim 15 including impinging said flame on said chucks for a predetermined period of from about ten seconds to about thirty seconds.

17. A method as in claim 16 including the step of brushing said chucks to remove oxidized plastic material residue.

18. A method of removing a protective plastic coating material comprising an ionic copolymer material which is formed from ethylene and methacrylic acid from chucks of the type operable to support and convey glassware through a protective plastic coating process at a predetermined speed, the method comprising the steps of:
impinging a flame, burning on a natural gas-oxygen fuel mixture comprising about one part gas and about four parts oxygen, on said chucks, while said chucks are moving at said predetermined speed, and are unconfined by walls so that heat, sufficient to oxidize said material, is not concentrated on said chucks by any means other than said direct flame impingement,
thereby burning and oxidizing said material in order to remove it so as to maintain said chucks operational.

19. A method of removing a protective plastic coating material from chucks of the type operable to support and convey glassware through a protective plastic coating process at a predetermined speed, the method comprising the steps of:
impinging a flame, burning on a natural gas-oxygen fuel mixture comprising about one part gas and about four parts oxygen, on said chucks, while said chucks are moving at said predetermined speed,
thereby burning and oxidizing said material in order to remove it so as to maintain said chucks operational, and while at the same time raising the skin temperature of the chucks no higher than about 1000°F. as measured immediately after said flame impingement.

20. A method of removing a protective plastic coating material comprising an ionic copolymer material which is formed from ethylene and methacrylic acid from chucks of the type of operable to support and convey glassware through a protective plastic coating process at a predetermined speed, the method comprising the steps of:
impinging a flame, burning on a natural gas-oxygen fuel mixture comprising about one part gas and about four parts oxygen, on said chucks, while said chucks are moving at a predetermined speed, and in an open unconfined area,
thereby burning and oxidizing said material in order to remove it so as to maintain said chucks operational, and while at the same time raising the skin temperature of the chucks no higher than about 100°F. as measured immediately after said flame impingement.

21. A method of removing plastic coating material comprising an ionic copolymer material which is formed from ethylene and methacrylic acid from chucks of the type operable to support and convey glassware through a protective plastic coating process at a predetermined speed, the method comprising the steps of:
impinging a flame, burning on a natural gas-oxygen fuel mixture comprising about one part gas and about four parts oxygen, on said chucks, while said chucks are moving at said predetermined speed, and in an open, unconfined area;
thereby burning and oxidizing said material in order to remove it so as to maintain said chucks operational.

22. A method of removing plastic coating material from chucks of the type operable to support and convey glassware through a protective plastic coating process at a predetermined speed, the method comprising the steps of:
impinging a flame, burning on a natural gas-oxygen fuel mixture comprising about one part gas and about four parts oxygen, on said chucks, while said chucks are moving at said predetermined speed, and in an open, unconfined area;
thereby burning and oxidizing said material in order to remove it so as to maintain said chucks operational.

23. A method of removing plastic coating material from chucks of the type used to support and transfer glass containers during a protective plastic coating process wherein a finely divided ionic copolymer material, which is formed from ethylene and methacrylic acid, is sprayed onto said containers by an electrostatic dry powder process and is then heat cured to form a protective plastic coating thereon, and wherein said containers are preheated while in said chucks and particles of said material adhere to said chucks, the method comprising the steps of;

impinging a flame, burning on a fuel mixture of about one part natural gas and about four parts oxygen, on selected chucks during said process at a time when said selected chucks are not supporting or transferring glassware, and thereby burning and oxidizing said ionic copolymer material on said chucks.

\* \* \* \* \*

UNITED STATES PATENT OFFICE
CERTIFICATE OF CORRECTION

PATENT NO. : 3,909,289
DATED : September 30, 1975
INVENTOR(S) : Donald D. Foucart & Jon R. Cottrill It is certified that error appears in the above-identified patent and that said Letters Patent are hereby corrected as shown below:

Column 2, line 21, "be", second occurrence, should read -- a --.

Column 4, line 6, "chunks" should be --chucks--.

Column 4, line 15, between the words "wiped" and "with", insert the word --off--.

Column 7, line 32, "jaw" should be --jaws--.

Column 7, line 51, "500" should be --550--.

Column 10, line 16, between the words "complete" and "assembly", insert the word --burning--.

Column 10, line 53, "burshing" should be --brushing--.

Column 11, line 33, between the words "speeds" and "without", insert the word --and--.

Column 12, line 15, "burshing" should be --brushing--.

Column 14, line 38, "100°F." should be --1000°F.--.

Signed and Sealed this thirteenth Day of April 1976

[SEAL]

Attest:

RUTH C. MASON
Attesting Officer

C. MARSHALL DANN
Commissioner of Patents and Trademarks